Patented Sept. 5, 1922.

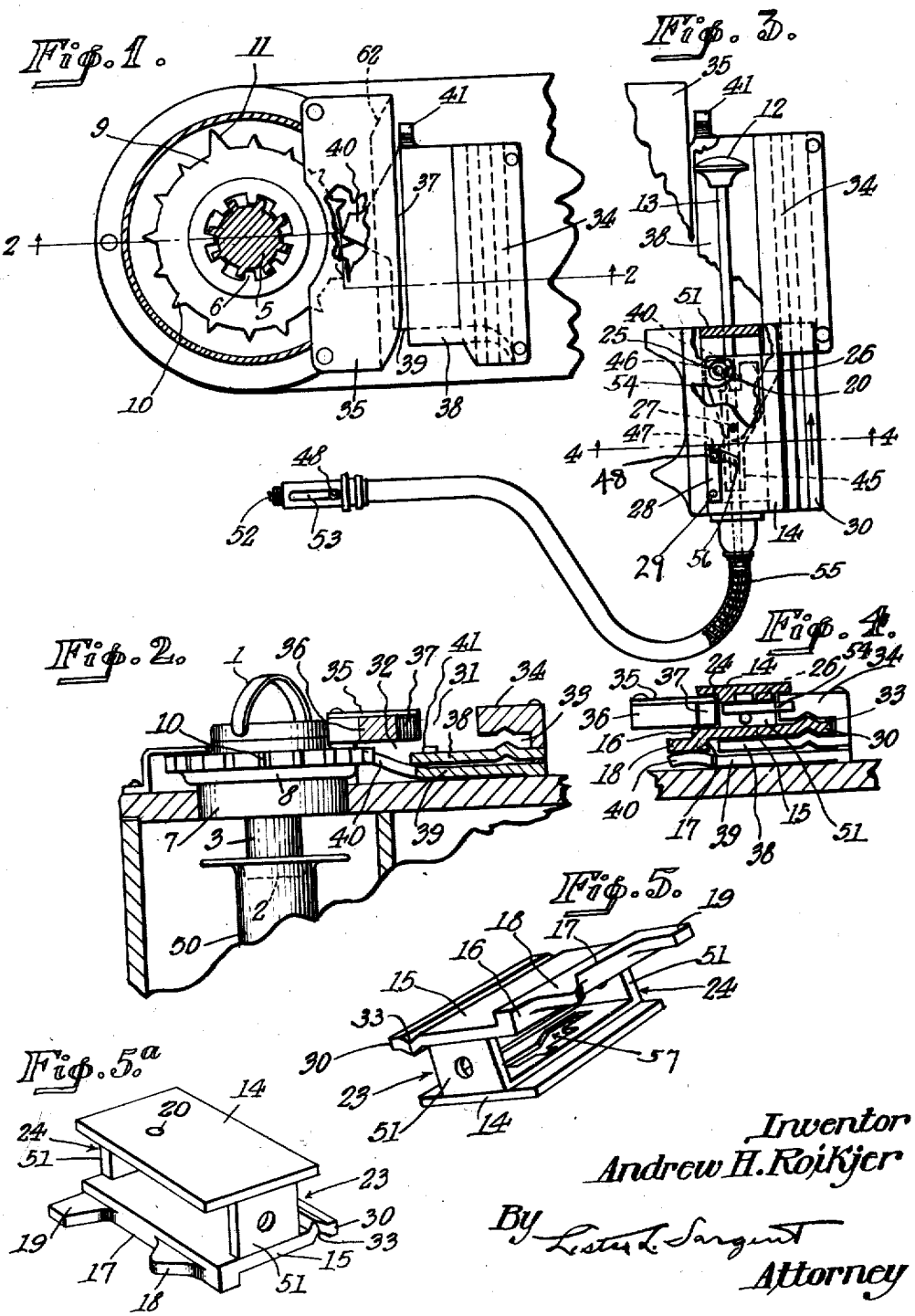

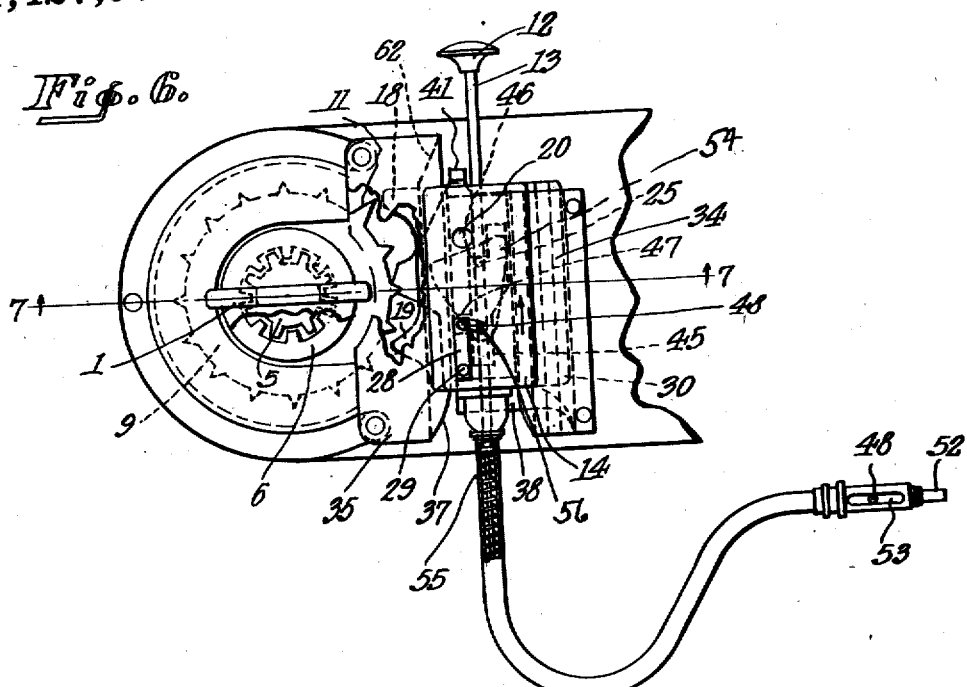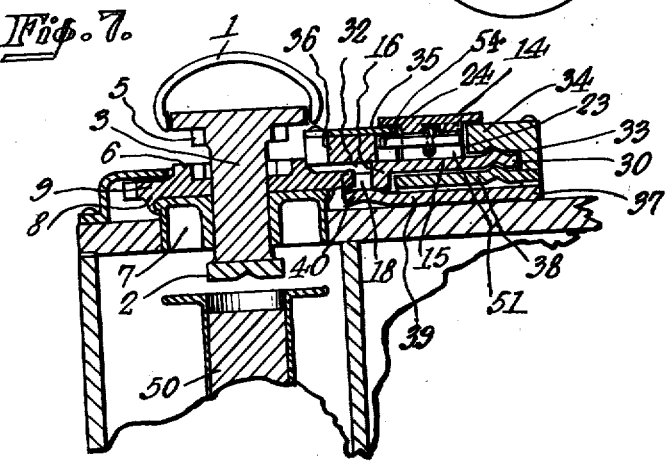

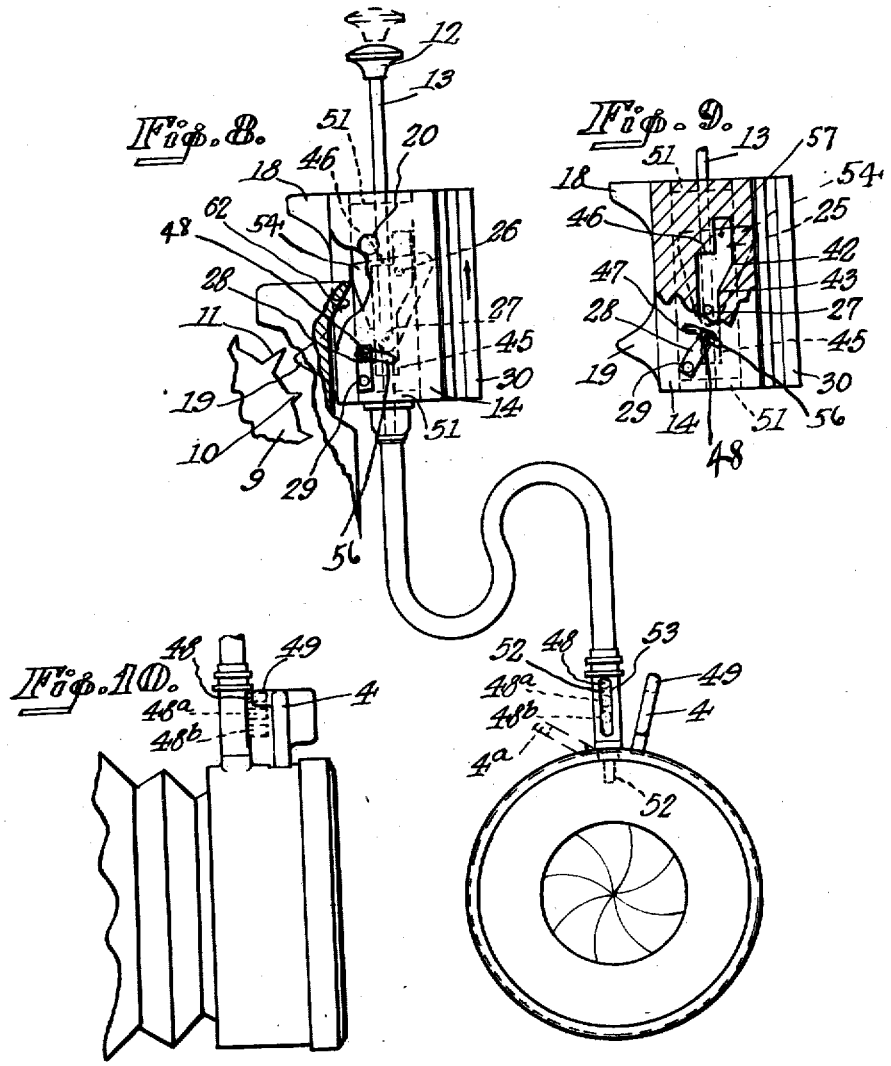

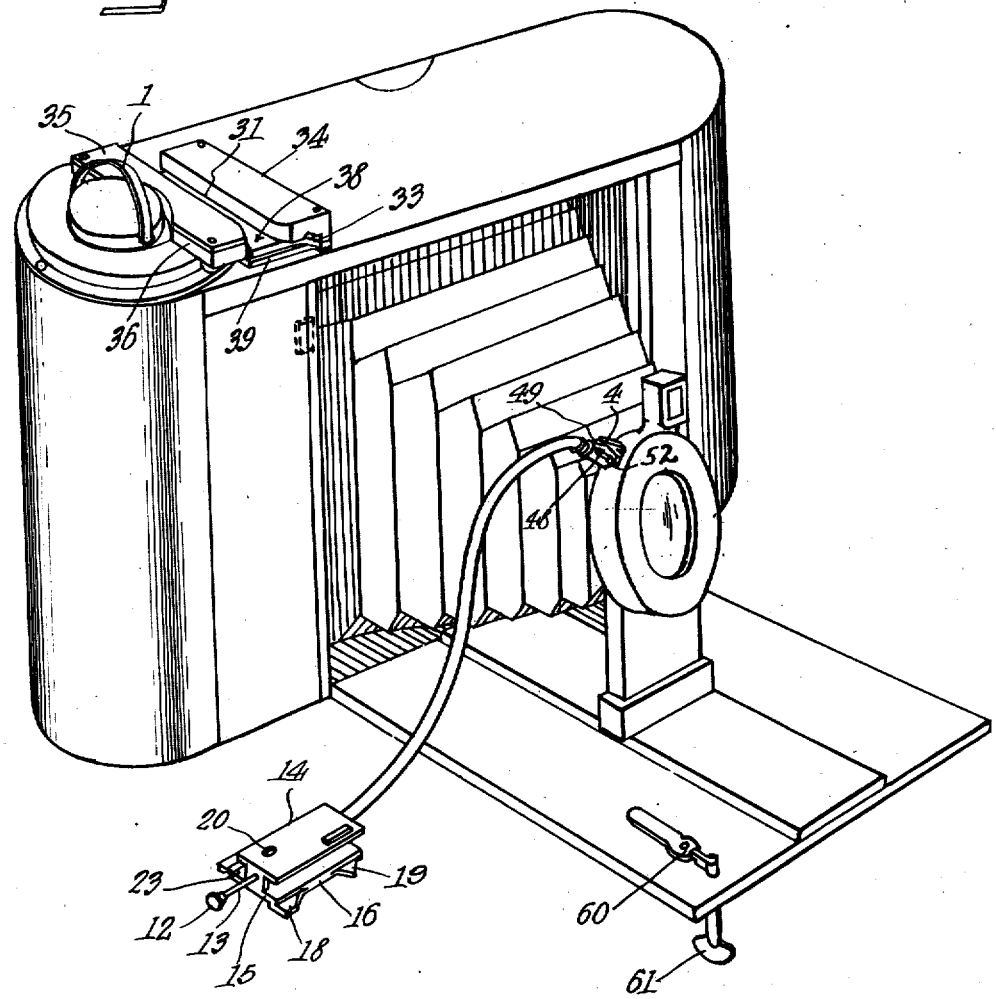

1,427,973

UNITED STATES PATENT OFFICE.

ANDREW H. ROIKJER, OF BOISE, IDAHO.

INTERLOCKING DEVICE FOR AVOIDING DOUBLE EXPOSURES AND BLANK FILMS.

Application filed April 21, 1921. Serial No. 463,282.

*To all whom it may concern:*

Be it known that I, ANDREW H. ROIKJER, a citizen of the United States, residing at Boise, in the county of Ada and State of Idaho, have invented a new and useful Interlocking Device for Avoiding Double Exposures and Blank Films, of which the following is a specification.

The object of my invention is to provide a novel interlocking device for use on film cameras, primarily, to avoid or lessen double exposure and blank films; and to provide positive locking means in connection with such a device for controlling the operation of the shutter and the rotation of the film spool whereby to avoid the actuation of the shutter until a new exposure area of film has been brought into operative position for exposure. It is further my object to provide the novel combination and arrangement of parts disclosed in the accompanying drawings, in which—

Figure 1 is a section through the film spool and adjacent portions of the camera to which my invention is applied, parts of the apparatus being shown in elevation, with a portion broken away to show the engagement of the cog wheel teeth;

Fig. 2 is a section on line 2—2 of Fig. 1, longitudinally of a small portion of the end of the camera containing the film spool;

Fig. 3 is a detail view, principally in elevation but with parts broken away and in section, showing details of the locking mechanism;

Fig. 4 is a detail sectional view on line 4—4 of Fig. 3;

Fig. 5 is a detail sectional view of the shutter lock in a reverse position from that shown in Fig. 4 and detached from the other portion of the mechanism illustrated in Fig. 4;

Fig. 5ª is a perspective view of the member shown in Fig. 5, but in reverse position, to accord with the showing in Fig. 4;

Fig. 6 is an end elevation of the camera case, with a portion of the guard member broken away to show the cog wheel construction, and with other parts of my device shown in dotted lines;

Fig. 7 is a longitudinal detail sectional view on line 7—7 of Fig. 6;

Fig. 8 is a detail plan view of the locking mechanism showing the operative connection between the shutter lock and the film spool lock;

Fig. 9 is a detail view, partly in section and partly in elevation of a portion of the shutter lock;

Fig. 10 is a side elevation of the shutter portion of the camera and the locking mechanism immediately related thereto;

Fig. 11 is an isometric view of the camera with my invention applied thereto.

Like numerals indicate like parts in each of the several views.

Referring to the accompanying drawings illustrating my invention applied to a film camera, the conventional film spool 50 is engaged by the key 2, the shaft 3 of which is provided with handle 1 all of conventional construction, as shown in Figs. 2 and 7. Mounted on film spool key shaft 3 I provide a cog wheel 5 the teeth of which engage between the teeth of an internally-toothed cog wheel ring 6, which element is provided with an externally toothed rim 9 on which is formed an integral cup 8 which engages over the flanged end of the annular bearing 7 in which latter member is mounted the slidable film spool key shaft 3. The rim 9 is provided with spaced teeth 10 of like size and a single extended tooth 11 of larger size than the teeth 10, as shown in Figs. 1 and 6.

Referring to Fig. 3, I provide a conventional plunger rod 13 having the usual button 12, said rod 13 being attached to the triangular plate 54 by means of a pivot 27 as shown in Figs. 3, 7 and 9.

Referring to Figs. 4, 5, and 5ª, I provide an outer or top plate 14 and an inner or bottom plate 15, which plates are held in spaced relation by the end spacing plates 51 of less width than plates 14 and 15. As shown in Figs. 4 and 7 inner plate 15 is provided with an inwardly turned portion 16, which in turn is provided with a lateral extension 18 and a lateral extension 19 with the cut out portion or recess 17 as shown in Figs. 5 and 5ª. As shown in Fig. 6 outer plate 14 is provided with orifice 20. Inner plate 15 is provided with a longitudinally grooved and raised portion 33 terminating in the edge portion 30. The space 25 between the projecting edges of plate 14 and plate 15 provides a passage for the extended end 34 of plate 38, which plate prevents spring 39 from springing outward so that its projecting end might engage in the teeth 10 of the rim 9 of cog ring 6 as shown in Figs. 2, and 7. Similar to the space or channel 23, I provide on the opposite side between the projecting edges of plates 14 and 15 a space or channel 24. Positioned on member 54, I provide a white painted spot 25, which when the shutter is operated or immediately preceding operation is aligned with orifice 20.

Referring to Figs. 3 and 9, I provide an irregular channel 55 into which the extended end of pivot 27 projects, as shown in Fig. 9, and which member when plunger 13 is operated, moves down the slanting portion of channel 57 from the point designated 44 to the point designated 43 and to the point designated 45 near the inner end of the channel at which position the shutter is open. At this point it engages in the arcuate slot 56, as shown in Fig. 6. I provide on member 54 an upstanding pin 26. Arcuate slot 56 is offset from channel 57.

Referring to Fig. 6, I provide a swing lever 28 mounted on pivot 29, which is adapted to be moved into the path of triangular plate 54 to prevent an exposure being made by stopping the plunger 13 and plate 55 from moving down the required distance to effect an operation on the shutter, or in other words stopping it before the end of pivots 27 reached point 45 in channel 57.

Referring to Fig. 2, the space opposite the end of extension 34 is designated 31; and the space opposite the end of plate 38 is designated 32 for convenience in description.

Referring to Fig. 4, I provide a thin strip 35 mounted on a heavier strip 36, said member 35 having its edge projecting into the space 24 between plates 14 and 15, as shown in Fig. 7, the recessed portion 37 of strip 36 affording space for the passage of triangular plate 54 for a predetermined distance, as indicated in Figs. 6 and 8.

Referring to Figs. 2, 7, and 6, I provide a spring 39 having a raised end or point 40 adapted to engage in the teeth or cogs 10 of rim 9 of cog wheel 6. Spring 39 is provided with an upstanding portion 40 adapted to engage teeth 10 and 11, under certain conditions.

As shown in Fig. 9, channel 57 is provided with an abutment portion 46 against which pivot 27 contacts on the return movement of plunger 13 to provide a locking element for the plunger.

Referring to Fig. 8 I provide on the flexible cable 58 which operatively connects the shutter controlling mechanism and the film spool locking mechanism, a pin 48 in proximity to the shutter mechanism, said pin traveling in channel 52 of the cable casing 53, the different positions or degrees to which it is movable being designated 48ᵃ and 48ᵇ, respectively. In connection with the shutter mechanism I provide a lever 49 having a swinging range of movement from the position indicated by 4 in full lines to the position indicated by 4ᵃ in dotted lines, in Fig. 8.

It is my purpose as above set forth to provide a construction in which to lock, interconnected with each other and co-acting in slots as described are so arranged that the locks can go through in one way, and each lock is thereafter locked against a second operation until the other or alternative lock has first been operated. In operating the device the handle 1 and film spool key 2 are used in the customary manner to operate the film spool but in operating the film spool the tooth internal ring 6 meshes with the gear teeth 5 affixed to the film spool key shaft 3, thus rotating the ring 6 and its rim 9 which is an integral part of it. The point 40 of spring 39 normally catches in the cogs 10 of rim 9, thus locking member 6 against turning and thereby making its impossible to wind any film. This spring 39 must be forced downward to disengage it from cogs 10 in order to wind the film. Plate 38 prevents forcing member 39 downward through the opening 31 (see Fig. 2); and extension 34 of member 38 provides a space or channel 33 into which a key element of corresponding shape will fit or slide, but which will not receive a flat or straight piece. Members 38, 34, 35, and 36 are fastened to the wall of the camera in the positions illustrated in Figs. 1 and 2 adjacent to the film winding mechanism and forming the channel 31, 32 and 33, adapted to receive the cable-attached locking element—a composite mechanism comprising the plates 14 and 15, the spacing members 51, plunger 13, triangular plate 54, lever 28, and pin 25, all arranged as illustrated in Figs. 3 and 5 and insertable between members 34 and 35 in the direction indicated by an arrow on Fig. 3—and which locking element also functions as the shutter control device through the covered flexible cable 52.

The operation of the above described locking element or mechanism in controlling the operation of the shutter involves the pressing inward of plunger 13 by a button 12 from its normal position shown in Fig. 3, in which position pin 26 is aligned with opening 26 in plate 14 and from which it moves to the positions shown in Fig. 8 and Fig. 9, successively until it reaches the point in the channel 57, which in Figs. 3, 8 and 9 and 6 is designated 45 at which point the shutter is opened by the movement of the cable 52 engaging suitable conventional shutter actuating mechanism (not shown) and which latter mechanism is not claimed as my invention. Pin 26 on triangular plate 54 travels in channel 57 thus moving the triangular plate in a lateral direction in passing from point 42 to point 43 of channel 57, as well as in a longitudinal direction relative to this channel and thereby aligning pin 26 with the abutment portion 46 of channel 57 so that when the plunger is released the spring 55, which is attached to the flexible cable 52 and to which cable the plunger 13 is also attached, tends to return cable 52 to its normal retractive position and plunger 13 to its normal outward position, but limiting its return movement by reason of the abutment 46, if the camera is set on time exposure, and allows the catch to close the shutter. On again pushing the plunger 13 inward manually and causing the pin 26 to travel as far as point 55 in groove 57 the pin will again be forced back to abutment 46. Pin 26 must be permitted to travel back to the outer end or beginning of channel 57 before the shutter can again be operated, the triangular plate 54, its pin 26 and plunger 13 of the locking element has thus moved into the position illustrated in Fig. 6, but before the insertion of that mechanism between members 35 and 34. It is thereupon inserted, as shown by arrows in Fig. 6 and Fig. 8, the thin plate 35 passing into the space 24 and under the top plate 14, the recessed thick plate 36 being recessed sufficiently so that it does not touch the extension 19 at this time.

Referring to Fig. 6 when the locking mechanism was inserted between members 34 and 35 its further inward movement was arrested by the contact of projection 19 with one of the teeth 10 of rim 9 of the spool locking cog wheel ring in which position of the instrument member 19 would be directly over the raised end 40 of spring 39 and have forced that member out of engagement with teeth 10 of rim 9, as shown in Fig. 7, at which time it is possible to wind the film, the insertion of the cable-attached locking element comprising the means for releasing the film spool for winding as described. In case the operator however forgot to wind the film, or changed his mind and withdrew the locking element, the plunger 13 and the triangular plate 54 would still remain in the same position with pin 26 in engagement with abutment 46 and the shutter could not be operated. An attempt to wind the film before operation of the shutter mechanism is prevented by reason of the fact that one of the cogs 10 would immediately engage projection 18 pulling it through as far as the cogs would reach after which time the locking element could not be released, but the further turning of the film would bring the cog 11 around and it would not engage projection 19, but after it had passed 19 it would engage projection 18 owing to cog 11 being longer than cog 10 so that the next revolution of the cog wheel would cause cog 11 to engage 19 and force the locking element still further through the members 34 and 35, the bottom plate 15 would glide over spring end 40 when, as shown in Fig. 4, the inwardly projecting front end of member 36 would force triangular plate 54 out of channel 24, when it would extend beyond the wall of end spacing member 51. Extension 34 being shorter than member 37 would allow it to do so, but the bottom plate 15 of the locking element would still be resting on raised end 41 of spring 39 after the cog 11 had released its engagement of projection 19 and consequently as long as it remained there it would be possible to wind the film and this condition the locking element has moved from the position in Fig. 6 to the position shown in Fig. 7.

After having wound the required amount of film, determined in the usual manner by looking through the customary peep hole in the camera back, the operator removes the locking element from between members 34 and 35. Owing to the upstanding position to which L-shaped end 41 immediately springs it would not be possible to insert the shutter lock between members 34 and 35 from the direction in which it has just been removed. Neither would it be possible to insert it from the opposite direction, the proper one, owing to the locking element extending beyond the wall 51, as shown in Fig. 4, so that no more film can be wound at this time. It is thus impossible to open the shutter before some film has been wound; and it is also impossible to work the shutter more than once between each film winding whether set for time, bulb or instantaneous exposure.

While there is no given length of film winding necessary double exposure would nevertheless be unlikely because the instrument compels a winding of film before the shutter can be operated.

Referring to Fig. 3 when plunger 13 is in its outermost position the white painted spot 25 on triangular plate 54 is aligned under and can be seen through orifice 20, thus indicating that the mechanism is in condition for a photograph to be made; and vice versa, when the white spot is not visible, this fact indicates that the next appropriate operation is to wind the film.

Referring to Fig. 8 the L-shaped lever 49 may be used in place of the flexible cable 52 to make an exposure; by the movement from the position indicated by 4 to the position indicated in dotted lines by 4ª. A pin 48 attached to endless cable 52 and projecting through slot 53, as shown in Figs. 6 and 8, to move into the path of oscillatory lever 49 and prevent improper operation of lever 49, as when the mechanism was set for the winding of film.

I further provide a lever 28 pivotally mounted on plate 14 by a pivot 9, said lever 28 having an inwardly projecting pin 48 engaging in the arcuate slot 47, which lying in the path of the extended end of pivot 27 would check the movement of plunger 13 and flexible cable 52, and the spring 55 would cause the automatic return of cable 52 to the position shown in Fig. 6 and no exposure could be made. When, however, pin 48 on cable 52 has been moved to the position 48$^b$ an exposure is made; and when in the position 48$^a$ it is possible to operate lever 49 for making any kind of exposure, time or instantaneous, but after the one exposure a second exposure cannot be made until the locking element has again been passed through the grooved members 34 and 35 and the film spool released for winding. The shutter lock device, as indicated in the drawings is inserted as shown by the arrows and moved entirely through the channels 36 and 31 in the one direction. The slanting wall 62 functions as shown in Fig. 8 to operate triangular member 54 to a position in which plunger 13 may move to the dotted line position shown, in which position the shutter can be operated by plunger 13.

It is within the contemplation of my invention to substitute any suitable or conventional equivalent actuating means for actuating the triangular plate 54 in lieu of that shown.

What I claim is—

1. In an apparatus of the class described the combination with a camera utilizing a film and film spools, of gear mechanism operatively connected with one end of the film winding spool, spaced grooved plates in proximity to said gear mechanism and shaped to receive a compact shutter controlling apparatus, a spring-return flexible cable to which said shutter controlled apparatus is attached and by which the shutter is operated to cause an exposure of the film, means for manually actuating said cable, and means for locking the shutter after each operation thereof until a winding of the film shall have occurred.

2. In an apparatus of the class described the combination with a camera utilizing a film and film spools, of gear mechanism operatively connected with one end of the film winding spool, spaced grooved plates in proximity to said gear mechanism and shaped to receive a compact shutter controlling apparatus, a spring-return flexible cable to which said shutter controlled apparatus is attached and by which the shutter is operated to cause an exposure of the film, a manually operated plunger of which the flexible cable is an extension, a pivoted locking element attached to the plunger, and means on the shutter controlling apparatus for locking the film winding spool gear against rotation except after each operation of the shutter mechanism whereby an exposure of the film is effected.

3. In a shutter controlling apparatus of the type described, the combination of a flexible operating cable operatively connected with the shutter, of spaced plates, one of said plates being longitudinally grooved, and the other plate being provided with a longitudinal channel of irregular and partially slanting shape, spacing members on which said plates are mounted, a plunger adapted to be manually operated and forming an externally projecting extension of the flexible cable, a substantially triangular locking plate pivoted to said plunger, said plate having a pin projecting therefrom and extending into the irregular shaped channel in the channel plate whereby to limit the return movement of the plunger under predetermined conditions.

4. In an apparatus of the class described, in combination with a camera having a shutter controlling device of a film spool locking mechanism adapted to co-act therewith, the latter mechanism comprising a gear mounted on the end of the film spool, an internally toothed cog wheel meshing with said gear, said cog wheel having an externally toothed rim, said rim including one extended cog adapted to interlock with the shutter controlling device to prevent operation of the film spool under predetermined conditions, substantially as described.

ANDREW H. ROIKJER.